United States Patent
Shafer et al.

(10) Patent No.: US 9,797,342 B2
(45) Date of Patent: Oct. 24, 2017

(54) PORT INJECTION SYSTEM FOR GASEOUS FUELS

(71) Applicant: CATERPILLAR INC., Peoria, IL (US)

(72) Inventors: Scott F. Shafer, Morton, IL (US); Dennis Henderson Gibson, Chillicothe, IL (US); Lifeng Wang, Dunlap, IL (US); Alan Ray Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 372 days.

(21) Appl. No.: 14/525,810

(22) Filed: Oct. 28, 2014

(65) Prior Publication Data

US 2016/0115922 A1  Apr. 28, 2016

(51) Int. Cl.
F02M 21/02 (2006.01)
F02M 51/06 (2006.01)

(52) U.S. Cl.
CPC .... *F02M 21/0233* (2013.01); *F02M 21/0242* (2013.01); *F02M 21/0278* (2013.01); *F02M 21/0215* (2013.01); *Y02T 10/32* (2013.01)

(58) Field of Classification Search
CPC ........... F02M 21/0233; F02M 21/0242; F02M 21/0278; F02M 21/0215; Y02T 10/32
See application file for complete search history.

(56) References Cited

U.S. PATENT DOCUMENTS

| | | | |
|---|---|---|---|
| 870,125 A | 11/1907 | Petsche | |
| 4,598,867 A * | 7/1986 | Trachte | F02M 45/08 239/453 |
| 5,996,558 A * | 12/1999 | Ouellette | F02D 19/10 123/27 GE |

(Continued)

FOREIGN PATENT DOCUMENTS

WO  WO 2010/016343  2/2010
WO  WO 2011/015329  2/2011

*Primary Examiner* — David Hamaoui
(74) *Attorney, Agent, or Firm* — Finnegan, Henderson, Farabow, Garrett & Dunner LLP

(57) ABSTRACT

A port injection system for gaseous fuels may include an injector body defining a hydraulic fluid inlet chamber, a hydraulic fluid exit passageway, a hydraulic fluid actuation passageway, a check valve inlet passageway fluidly connected with the hydraulic fluid actuation passageway, a valve chamber, and a gaseous fuel inlet chamber. An electrical solenoid actuator may be mounted to the injector body, with the electrical solenoid actuator including a movable armature, and a poppet valve connected to the movable armature and disposed within the valve chamber. The poppet valve may be movable between a pressurized hydraulic fluid flow blocking position and a pressurized hydraulic fluid flow passing position. A check valve may be disposed within the check valve inlet passageway. A gas admission valve may be disposed at least partially within the gaseous fuel inlet chamber and in contact with the check valve such that movement of the check valve by hydraulic fluid entering the check valve inlet passageway results in actuation of the gas admission valve away from a normally closed position closing off the gaseous fuel inlet chamber to a fuel injection position wherein gaseous fuel is allowed to flow from the gaseous fuel inlet chamber into an intake manifold or intake port of an engine on which the injector body is mounted.

18 Claims, 4 Drawing Sheets

(56) References Cited

U.S. PATENT DOCUMENTS

| | | | |
|---|---|---|---|
| 6,260,776 B1 * | 7/2001 | Popp | F02M 47/046 |
| | | | 239/124 |
| 6,474,295 B2 | 11/2002 | Milam | |
| 6,575,138 B2 | 6/2003 | Welch et al. | |
| 6,761,325 B2 * | 7/2004 | Baker | F02M 43/02 |
| | | | 239/533.2 |
| 6,796,543 B2 * | 9/2004 | Haeberer | F02M 47/027 |
| | | | 239/585.3 |
| 2012/0160213 A1 | 6/2012 | Vijayaraghavan et al. | |
| 2013/0146029 A1 | 6/2013 | Kim et al. | |

* cited by examiner

PORT INJECTION SYSTEM FOR GASEOUS FUELS

TECHNICAL FIELD

The present disclosure relates generally to a port injection system and, more particularly, to a port injection system for gaseous fuels.

BACKGROUND

Gaseous fuel powered engines are common in many applications. For example, the engine of a locomotive can be powered by natural gas (or another gaseous fuel) alone or by a mixture of natural gas and diesel fuel. Natural gas may be more abundant and, therefore, less expensive than diesel fuel. In addition, natural gas may burn cleaner in some applications.

Natural gas has traditionally been introduced into an engine's cylinders via a solenoid operated admission valve. Although effective in some applications, a solenoid operated admission valve may not have the speed and/or force required to open fast enough or against high boost pressures in other applications.

One attempt to improve gas injection is disclosed in U.S. Pat. No. 5,996,558 of Ouellette et al. that issued on Dec. 7, 1999 ("the '558 patent"). In particular, the '558 patent discloses a hydraulic actuated gaseous fuel injector. The injector includes an oil inlet port, a gas inlet port, and a gas injection port. High-pressure oil is supplied to the oil inlet port from an in-line fuel injection pump. When the pump pressurizes the oil for injection actuation, a force is applied under a gas injection needle, causing the needle to lift away from and unblock the gas injection port. Once the needle is in an open position, fuel introduced via the gas inlet port is allowed to flow into a corresponding combustion chamber via the injection port. In some embodiments, an electronically controlled valve is used to regulate oil flow into and out of the injector.

Although the hydraulic actuated gaseous fuel injector of the '558 patent may be an improvement over a solenoid operated admission valve, the injector may still suffer drawbacks. For example, reliance on pump pressure to actuate the injector may require very precise pump control and such control may be complex and costly. In addition, a different pump may be required for each injector of a multi-cylinder engine. Further, the injector design shown in the '558 patent may lack broad applicability in engines having tight space constraints (e.g., in dual fuel engines).

The port injection system of the present disclosure solves one or more of the problems set forth above and/or other problems in the art.

SUMMARY

In one aspect, the present disclosure is directed to a port injection system for gaseous fuels. The port injection system may include an injector body defining a hydraulic fluid inlet chamber, a hydraulic fluid exit passageway, a hydraulic fluid actuation passageway, a check valve inlet passageway fluidly connected with the hydraulic fluid actuation passageway, a valve chamber, and a gaseous fuel inlet chamber. An electrical solenoid actuator may be mounted to the injector body. The electrical solenoid actuator may include a movable armature, and a poppet valve connected to the movable armature and disposed within the valve chamber, the poppet valve being movable between a pressurized hydraulic fluid flow blocking position and a pressurized hydraulic fluid flow passing position. A check valve may be disposed within the check valve inlet passageway. A gas admission valve may be disposed at least partially within the gaseous fuel inlet chamber and in contact with the check valve such that movement of the check valve by hydraulic fluid entering the check valve inlet passageway results in actuation of the gas admission valve away from a normally closed position closing off the gaseous fuel inlet chamber to a fuel injection position wherein gaseous fuel is allowed to flow from the gaseous fuel inlet chamber into an intake manifold or intake port of an engine on which the injector body is mounted.

In another aspect, the present disclosure is directed to a method of injecting gaseous fuel from a fuel injector body connected to a cylinder head of an engine into a manifold or port of the engine. The method may include receiving pressurized hydraulic fluid at a hydraulic fluid inlet chamber in the injector body, and receiving pressurized gaseous fuel at a gaseous fuel inlet chamber in the injector body. The method may further include receiving a signal at a solenoid actuator mounted on the injector body, the signal being indicative of parameters of gaseous fuel injection. The solenoid actuator may be energized in accordance with the received signal to lift a poppet valve contained within a valve chamber of the injector body from a normally closed position, wherein the pressurized hydraulic fluid is contained by the poppet valve within the hydraulic fluid inlet chamber, to an open position, wherein the pressurized hydraulic fluid is allowed to enter the valve chamber and a hydraulic fluid actuation passageway leading from the valve chamber. The method may still further include actuating a gas admission valve from a normally closed position wherein the gas admission valve contains the pressurized gaseous fuel in the gaseous fuel inlet chamber to a gas injection position wherein the gas admission valve allows the gaseous fuel to flow from the gaseous fuel inlet chamber to the manifold or port of the engine by providing the pressurized hydraulic fluid from the hydraulic fluid inlet chamber, through the hydraulic fluid actuation passageway to act on the gas admission valve.

In another aspect, the present disclosure is directed to an engine system. The engine system may include a bank of cylinders, a gaseous fuel rail running along the bank of cylinders and configured to supply pressurized gaseous fuel to each of the cylinders, a plurality of junction blocks and gaseous fuel conduits spaced along the gaseous fuel rail and configured to supply the gaseous fuel from the rail to each of the cylinders, and a plurality of injector bodies, each injector body being associated with one or more cylinders of the bank of cylinders. Each injector body may define a hydraulic fluid inlet chamber, a hydraulic fluid exit passageway, a hydraulic fluid actuation passageway, a check valve inlet passageway fluidly connected with the hydraulic fluid actuation passageway, a valve chamber, and a gaseous fuel inlet chamber. An electrical solenoid actuator may be mounted to each injector body. The electrical solenoid actuator may include a movable armature, and a poppet valve connected to the movable armature and disposed within the valve chamber, the poppet valve being movable between a pressurized hydraulic fluid flow blocking position and a pressurized hydraulic fluid flow passing position. A check valve may be disposed within the check valve inlet passageway. A gas admission valve may be disposed at least partially within the gaseous fuel inlet chamber and in contact with the check valve such that movement of the check valve by pressurized hydraulic fluid entering the check valve inlet passageway results in actuation of the gas admission valve away from a normally closed position closing off the gaseous fuel inlet chamber to a fuel injection position wherein gaseous fuel is allowed to flow from the gaseous fuel inlet chamber into an intake manifold or intake port for the one or more cylinders.

DETAILED DESCRIPTION

Figure 1:
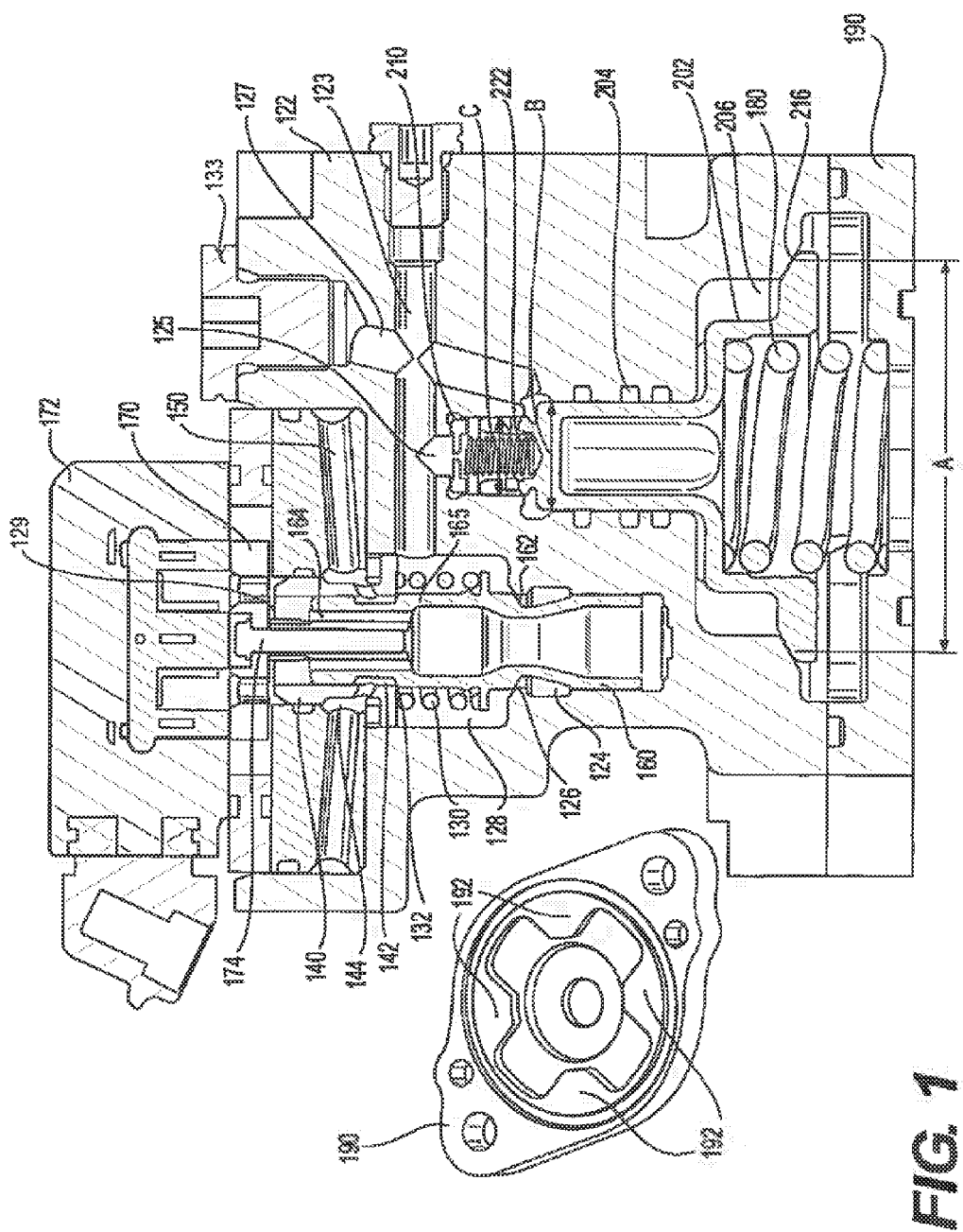
FIG. 1 is a cross-sectional illustration of an exemplary disclosed port injection system.

FIG. 1 illustrates an exemplary port injection system 110. The port injection system 110 may include an injector body 122 that defines various internal passageways for directing hydraulic fluid to and from a valve chamber 128 defined within the injector body 122. A hydraulic fluid inlet passageway (not shown) leads to a hydraulic fluid inlet chamber 124, at least a portion of which is in the shape of an annulus defined at a lower extent of the valve chamber 128. As shown in FIG. 1, the hydraulic fluid inlet chamber 124 is located below a lower, frustoconical seat 126 of the valve chamber 128. One or more hydraulic fluid exit passageways 150 may be formed in the injector body 122 to drain hydraulic fluid away from the valve chamber 128. A hydraulic fluid actuation passageway 123 leads from the valve chamber 128 to a check valve inlet passageway 125. A check valve 210 may be slidably disposed within the check valve inlet passageway 125. Hydraulic fluid entering the check valve inlet passageway 125 may move the check valve 210, thereby actuating a gas admission valve 202 that is contacted by or integral with the check valve 210.

Figure 2:
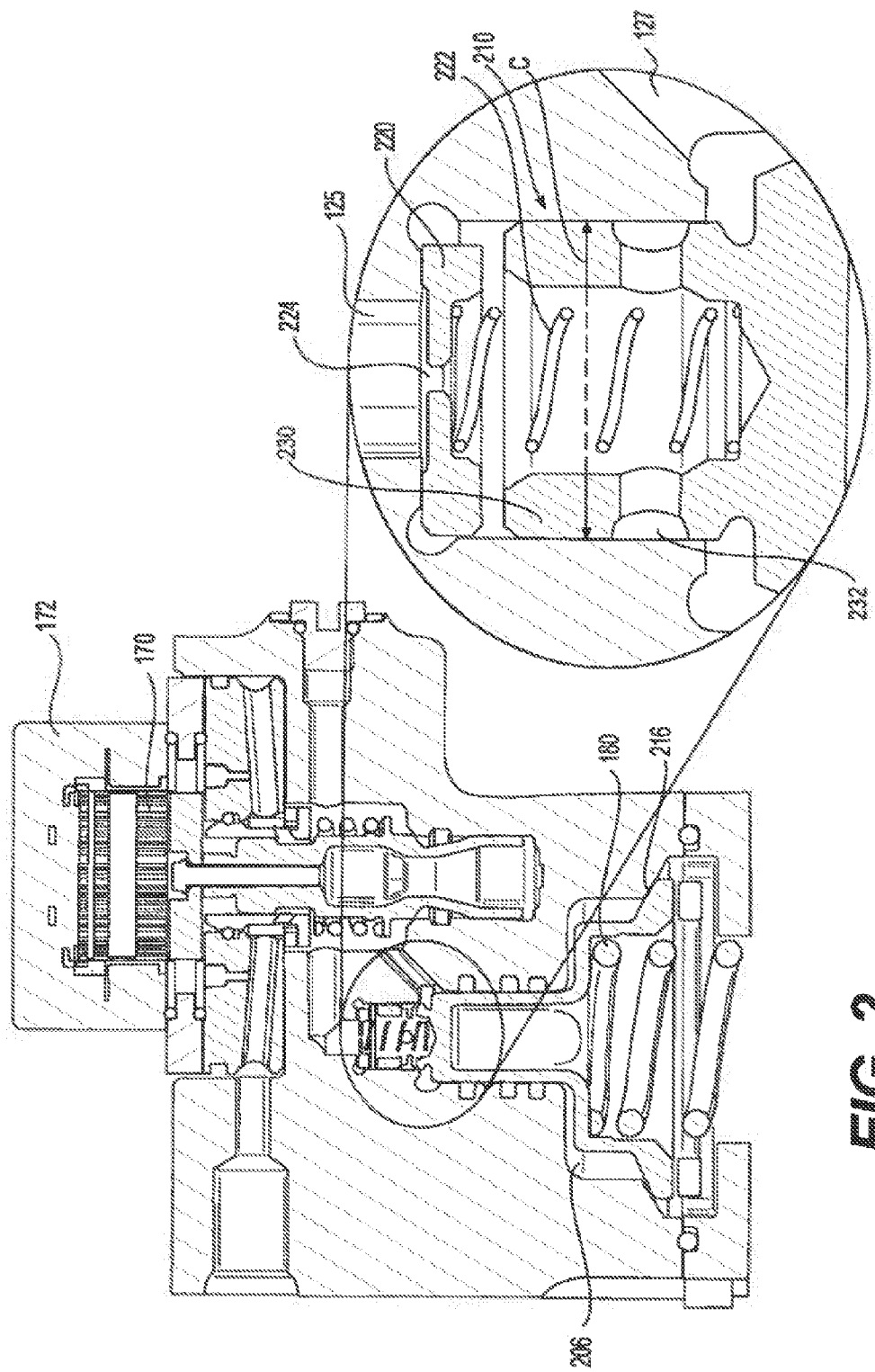
FIG. 2 is a cross-sectional illustration of the exemplary disclosed port injection system of FIG. 1, with an enlarged view of a check valve including a damper feature.

As shown in more detail in FIG. 2, the check valve inlet passageway 125 may have a first, smaller diameter portion connected to the hydraulic fluid actuation passageway 123, and a second, larger diameter portion (having a diameter C) containing the check valve 210. The check valve 210 may be provided with a damping feature, thereby acting as a hydraulic snubber. The damping feature may allow the check valve to absorb at least some of the compressive shock that may be transferred to the check valve from the gas admission valve 202 during actuation and return of the gas admission valve. In one exemplary implementation, as shown in the enlarged, detailed view of FIG. 2, the check valve 210 may include a piston hat portion 220 separated from a piston body portion 230 by a check valve spring 222. A small diameter, axially arranged bleed hole 224 may be formed through the piston hat portion 220. Additional radial venting holes 232 may also be provided radially through outer circumferential walls of the check valve 210. Hydraulic fluid entering check valve inlet passageway 125 to drive the check valve 210 and the gas admission valve 202 may enter into a hydraulic fluid chamber defined between the piston hat portion 220 and the piston body portion 230. When the actuation hydraulic pressure is released in order to allow the gas admission valve 202 to return to a closed position, the hydraulic fluid trapped within the hydraulic fluid chamber between the piston hat portion 220 and the piston body portion 230, along with check valve spring 222, may act as a damper. The flow of the hydraulic fluid back out of the hydraulic fluid chamber of check valve 210 through axially arranged bleed hole 224 and radial venting holes 232 may be at least partially restricted by the size of the holes through which the hydraulic fluid has to pass to return to the hydraulic fluid actuation passageway 123. The damping or snubbing feature of the check valve 210 may be predetermined as a function of the viscosity of the hydraulic fluid, the size of the axially arranged bleed hole 224 and the size and position of the radial venting holes 232. This damping or snubbing feature may be particularly important in slowing the closing velocity of the gas admission valve 202. In one non-limiting, exemplary implementation of this disclosure, the snubbing feature may prevent the gas admission valve from closing at a rate faster than approximately 1 meter/second. Some of the advantages achieved by this snubbing feature include improved durability of the gas admission valve (and the entire port injection system), and improved performance as a result of the elimination of bouncing by the gas admission valve. The snubbing feature may also prevent the gas admission valve 202 from slamming closed under the strong biasing force of a gas admission valve spring 180 when the actuation hydraulic pressure is released. The strong biasing force of the gas admission valve spring 180 may be determined as a function of a differential pressure between a positive boost pressure in the manifold into which pressurized gaseous fuel is released upon actuation of the gas admission valve and the pressure of the pressurized gaseous fuel.

The injector body 122 may also define one or more passageways for directing a gaseous fuel to a gaseous fuel inlet chamber 206. The gaseous fuel inlet chamber 206 may be selectively communicated with an intake manifold or an inlet port associated with one or more cylinders of an engine by actuation of the gas admission valve 202. The gas admission valve 202 may include a flared first end 208 that seats against a frustoconical shaped outlet opening 216 from the gaseous fuel inlet chamber 206. In the one exemplary implementation shown in FIG. 1, the diameter of the gas admission valve seat where the flared first end 208 seats against the frustoconical shaped outlet opening 216 may be A, where A is approximately 45 mm in diameter. A piston-shaped portion of the gas admission valve at the end opposite the flared first end 208 may be slidably received within a portion of check valve inlet passageway 125. Gas seals 204 may be provided at axially spaced intervals along the outer circumference of the piston-shaped portion of the gas admission valve 202 to prevent the escape of gaseous fuel from gaseous fuel inlet chamber 206. As shown in FIG. 1, the diameter B of the piston-shaped portion of the gas admission valve 202 may be larger than the diameter C of the check valve 210. In various implementations, the piston-shaped portion of the gas admission valve 202 may be formed integrally with the piston body portion 230 of the check valve 210. In the exemplary implementation shown in FIG. 1, the diameter B may be approximately 14 mm, while the diameter C may be approximately 10 mm. The shoulders formed at each of the intersections between different diameter portions of check valve inlet passageway 125 may also act as stops that limit the axial movement of the check valve 210 and gas admission valve 202. In alternative implementations, the check valve 210 and the gas admission valve 202 may be separate components. Additionally, other ratios of the relative diameters of the various portions of the check valve inlet passageway 125, the check valve piston body portion 230 (seen most clearly in the enlarged, detailed view of FIG. 2), the piston-shaped portion of the gas admission valve 202, and the seat of the gas admission valve may be varied in order to obtain a desired intensification effect that is a function of the relative diameters and surface areas on which the hydraulic fluid is acting, and on which the pressurized gaseous fuel is acting. As shown in FIG. 1, a plate stop 190 may also be provided to retain the gas admission valve spring 180 and the gas admission valve 202 in the injector body 122. The plate stop 190 may also include valve impact pads 192 that help to cushion the impact of the gas admission valve at the end of its travel when it is fully opened by the hydraulic fluid actuation pressure entering check valve inlet passageway 125.

A poppet valve 160 may be housed within the valve chamber 128, and connected by an attachment member 174 to a movable armature 170 of an electronically-controlled solenoid 172. The electronically-controlled solenoid 172 may be mounted to the injector body 122 using conventional fasteners such as bolts, adhesive, or other mounting means. Selective energization of the electronically-controlled solenoid 172 results in current flowing through internal windings of the solenoid 172 to establish a magnetic field. When the windings are energized, a magnetic field established by the windings may pull the armature 170, attachment member 174, and poppet valve 160 upward against the bias of a poppet valve spring 130 from a first or normally closed position to a second or flow passing position. When the windings of solenoid 172 are de-energized, the poppet valve spring 130 may push the poppet valve 160 back down to its normally closed position. In this manner, the timing and level of the induced current within the windings of the solenoid 172 may be controlled to affect the flow of hydraulic fluid into and out of valve chamber 128.

As shown in FIG. 1, the poppet valve 160 may have an hourglass shape. An intermediate tapered portion 162 of the poppet valve 160 may be configured to seat against the lower frustoconical seat 126 of the valve chamber 128 when the poppet valve 160 is biased to its normally closed position by the poppet valve spring 130. When the poppet valve 160 is seated on the lower frustoconical seat 126, pressurized hydraulic fluid supplied to the hydraulic fluid inlet chamber 124 is prevented from entering the rest of valve chamber 128.

At the upper extent of its travel during energization of the solenoid 172, a top surface 164 of the poppet valve 160 may be stopped against an upper seat 129 defined at a top end of the valve chamber 128. The top portion of the poppet valve 160 may be received within a cylindrical sleeve 140 positioned at the top end of the valve chamber 128. The cylindrical sleeve 140 may be provided with one or more angled drain passageways 144 that pass radially outward through the sleeve 140 to fluidly communicate with the hydraulic fluid exit passageways 150 defined through the injector body 122. An annular recess 142 defined around an outer circumference of the top portion of the poppet valve 160 may overlap the angled drain passageways 144 when the poppet valve is in its normally biased, closed position seated on the lower frustoconical seat 126 (the position illustrated in the exemplary implementation of FIG. 1). When the solenoid 172 is not energized, the poppet valve 160 is biased by the poppet valve spring 130 against the lower frustoconical seat 126. In this non-energized position, hydraulic fluid from the check valve inlet passageway 125 and the hydraulic fluid actuation passageway 123 is able to return to the valve chamber 128, pass into the annular recess 142 around the top portion of the poppet valve 160, and exit through the angled drain passageways 144 and the hydraulic fluid exit passageways 150.

When the solenoid 172 is energized, the poppet valve 160 is raised up off of the lower seat 126, thereby allowing pressurized hydraulic fluid to enter the valve chamber 128. When the poppet valve 160 is raised, the annular recess 142 defined at the top portion of the poppet valve 160 is moved upwardly out of alignment with the drain passageways 144 so that hydraulic fluid entering the valve chamber 128 is no longer able to exit through the hydraulic fluid exit passageways 150. As the poppet valve 160 lifts off of the lower seat 126 and is raised into contact with the upper seat 129, pressurized hydraulic fluid enters the valve chamber 128 from hydraulic fluid inlet chamber 124 and exits through hydraulic fluid actuation passageway 123. The pressurized hydraulic fluid may then enter check valve inlet passageway 125 and provide a driving force for actuating gas admission valve 202. As shown in FIG. 1, hat-shaped plugs 133 may be provided at the ends of the hydraulic fluid actuation passageway 123 and an additional venting passageway 127. These hat-shaped plugs 133 may provide controlled venting of any gases trapped within the passageways by the hydraulic fluid. Control of the flow of pressurized hydraulic fluid into valve chamber 128 from hydraulic fluid inlet chamber 124 by energization of solenoid 172 thereby indirectly controls actuation of gas admission valve 202.

Various implementations of the port injection system in accordance with this disclosure allow for flexibility in determining the hydraulic fluid pressures that are required for actuating the gas admission valve 202. The direct, fluid connection between the pressurized hydraulic fluid inlet chamber 124, the valve chamber 128, the hydraulic fluid actuation passageway 123, and the check valve inlet passageway 125 may also enable a nearly immediate actuation of the gas admission valve 202 upon energization of solenoid 172 to lift poppet valve 160 off of the lower seat 126. The injection timing may be controlled through various electronic controls of the energization of the solenoid 172. One or more computer processors may be configured to provide signals indicative of a desired interval between energizations of the solenoid 172, a desired length of time during which the solenoid 172 is energized, the frequency of energization, the amplitude of energization signals, and other control parameters.

The pressure of the hydraulic fluid introduced into the hydraulic fluid actuation passageway 123 may be completely independent from the pressure of the gaseous fuel provided to gaseous fuel inlet chamber 206. In various implementations of this disclosure, the hydraulic fluid provided to hydraulic fluid inlet chamber 124 of valve chamber 128 may be engine oil from a sump of the engine, diesel fuel used by the engine in dual fuel applications, or other hydraulic fluids. The injector body 122 allows for flexibility in the relative positioning and sizing of the hydraulic fluid inlet chamber 124, the hydraulic fluid exit passageways 150, the valve chamber 128, the hydraulic fluid actuation passageway 123, the check valve inlet passageway 125, the gaseous fuel inlet chamber 206, and the gas admission valve 202. This flexibility in the relative positioning and sizing of the various hydraulic fluid passageways, chambers, and actuation surfaces upon which the hydraulic fluid acts may enable implementations of the port injection system in accordance with this disclosure where the hydraulic fluid pressures do not have to be increased significantly over existing pressures in the engine. The injector body design may provide for hydraulic fluid passageways and actuation surfaces of sufficient effective area to enable actuation of the gas admission valve 202 against a strong biasing force from the gas admission valve spring 180 with hydraulic fluid pressures that are achievable with relatively inexpensive boost pumps. These same features of the injector body design may also allow for accurate control of fueling levels from 100% of maximum fueling levels down to less than 7% of the maximum fueling levels. The increased range of fueling levels over those generally achieved with conventional fuel injectors may avoid the need for cylinder cutout strategies, or in the case of dual fuel engines, any need for switching to operation on primarily diesel fuel at less than 50% maximum fueling levels.

Figure 3:
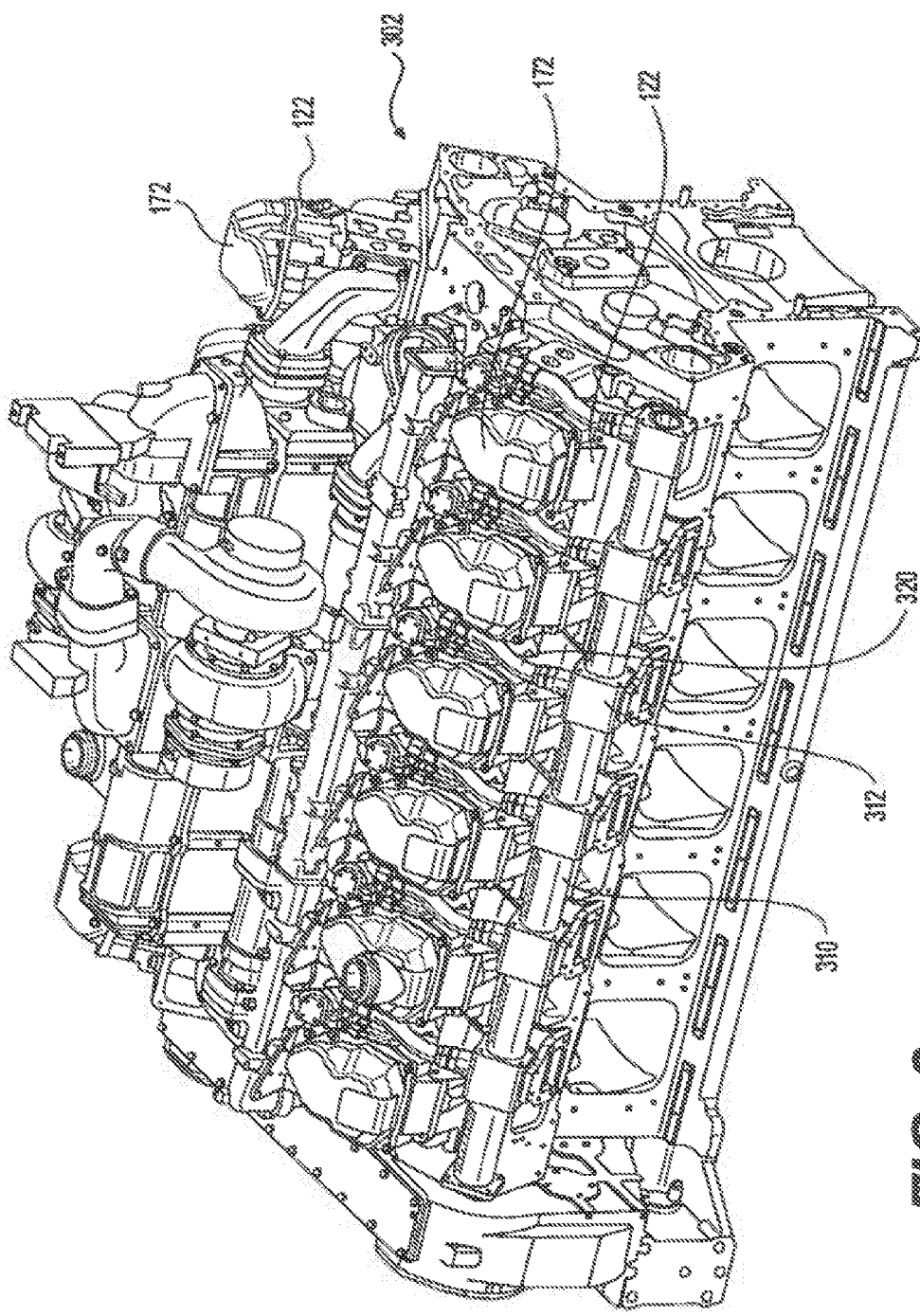
FIG. 3 is an isometric view of an engine system including the port injection system of FIG. 1.

Pressurized gaseous fuel from gaseous fuel inlet chamber 206 may enter into an intake manifold, or directly into or adjacent an intake port on an engine system, such as the engine system 302 shown in FIG. 3. The engine system 302 may be a four-stroke dual fuel engine, or another type of engine (e.g., a four-stroke gaseous fueled engine or a two-stroke dual fuel or gaseous fueled engine). The engine system 302 may include, among other things, an engine block defining a plurality of cylinders. One or more cylinder heads may be connected to the engine block to close off an end of each cylinder, and a piston may be slidably disposed within each cylinder. Each piston, together with the cylinder in which it is located, and the cylinder head that closes off an end of the cylinder may define a combustion chamber. The engine system 302 may include any number of combustion chambers, and those combustion chambers may be disposed in an "in-line" configuration, in a "V" configuration, in an opposing-piston configuration, or in any other suitable configuration. As shown in FIG. 3, a solenoid 172 and an injector body 122 may be bolted or otherwise connected to the cylinder head at one end of each cylinder. Actuation of each gas admission valve 202 within each injector body 122 may result in the injection of pressurized gaseous fuel into each cylinder.

Gaseous fuel (e.g., natural gas) may be mixed with air before, during, and/or after the air enters each combustion chamber. The gaseous fuel from gaseous fuel inlet chamber 206 may mix with the air from air intake ports in each cylinder head to form a fuel/air mixture within each combustion chamber. During each compression stroke, air may still be entering each combustion chamber via intake ports as each piston starts its upward stroke to mix any residual gas with air and fuel in the combustion chamber. Eventually, the intake ports may be blocked by motion of intake valves, and further upward motion of each piston may then compress the mixture. As the mixture within each combustion chamber is compressed, the mixture will increase in pressure and temperature until it combusts and releases chemical energy. This may result in a further and significant increase in the pressure and temperature within each combustion chamber. In a dual-fuel engine, an injection of liquid fuel (e.g., of diesel fuel) may be necessary to cause the mixture within each combustion chamber to ignite. For this purpose, a liquid fuel injector may be centrally mounted within each cylinder head to axially inject liquid fuel into each combustion chamber.

The gaseous fuel supplied to gaseous fuel inlet chamber 206, and from there into an intake manifold of the engine, or directly into or adjacent an intake port, may be provided from, for example, a high-pressure cryogenic tank configured to hold liquid fuel (e.g., liquefied natural gas—LNG) at low temperatures. The liquid fuel may be vaporized prior to entering gaseous fuel inlet chamber 206. In some applications, a heater, accumulator, and/or pressure regulator may be used to vaporize, contain, and circulate the fuel. As shown in FIG. 3, the gaseous fuel may be supplied to each gaseous fuel inlet chamber 206 in each injector body 122 through double-walled gaseous fuel supply rails 310, junction blocks 312 and double-walled individual gaseous fuel supply conduits 320.

The pressurized hydraulic fluid provided to hydraulic fluid inlet chamber 124 of valve chamber 128 may be, for example, engine oil, diesel fuel oil, dedicated hydraulic oil, or other hydraulic fluids. As described above, this hydraulic fluid may be used to selectively open and close the gas admission valve 202, thereby allowing a desired amount of gaseous fuel from the gaseous fuel inlet chamber 206 to be injected into each combustion chamber at a desired timing. In various implementations, a single pump may be used to pressurize the hydraulic fluid supplied to all injector bodies 122. In one exemplary implementation, the pump may be a separate pump dedicated to facilitating only fuel injection. In another alternative implementation, the hydraulic fluid pump may be used for additional purposes (e.g., to circulate engine oil throughout engine system 302 for lubrication and/or cooling purposes), if desired.

Figure 4:
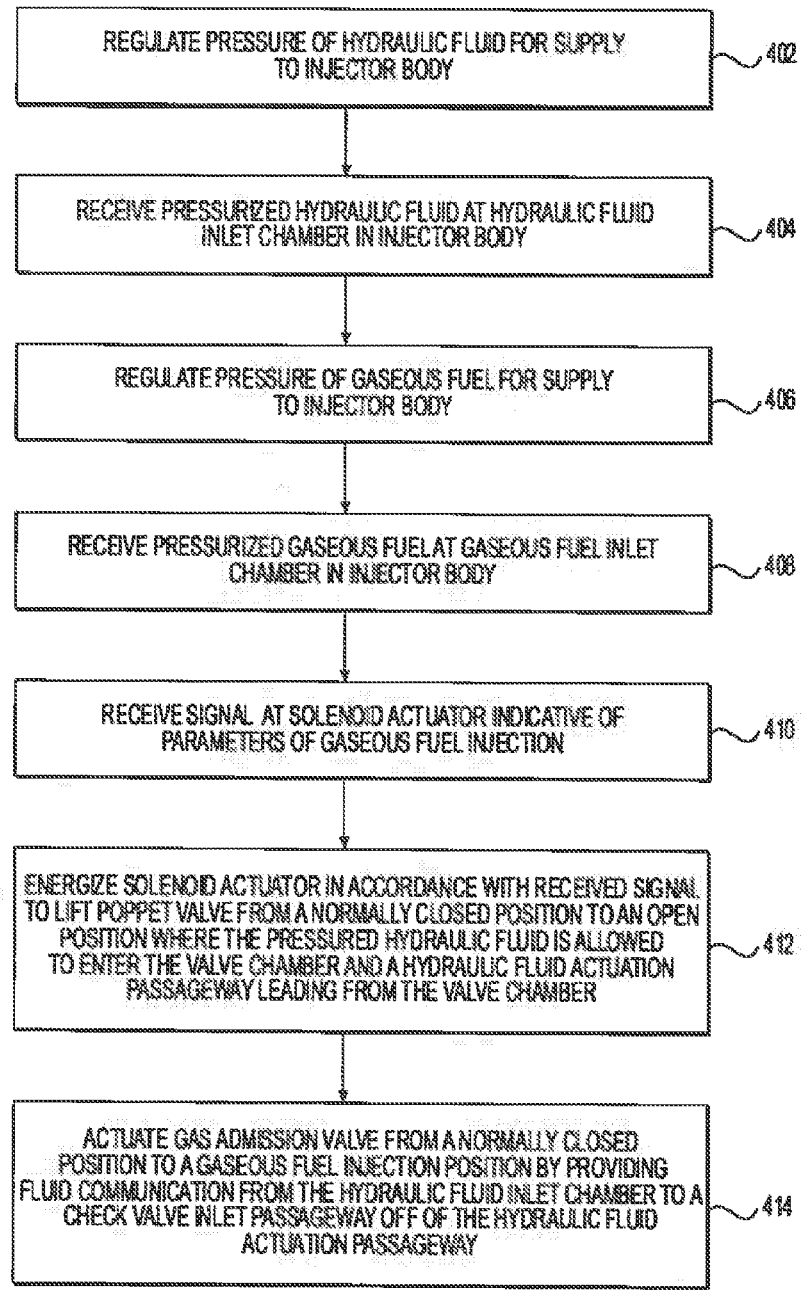
FIG. 4 is a flowchart showing an exemplary method of injecting gaseous fuel using the port injection system of FIG. 1.

An exemplary implementation of a method of operating a port injection system in accordance with this disclosure is shown in FIG. 4. Details of this method of operating the port injection system will be provided in the following section in order to further illustrate the concepts of this disclosure.

INDUSTRIAL APPLICABILITY

The disclosed port injection system may be used in any machine or power system application where it is beneficial to reduce fuel consumption costs and emissions of exhaust gases, while also delivering the desired power output. The disclosed port injection system may find particular applicability within mobile machines, such as locomotives, large construction equipment, marine vessels, power generation, oil pumping, and other work producing applications that can operate using both liquid and gaseous fuels. The disclosed port injection system may provide a unique way to deliver gaseous fuel, which is known to produce lower levels of regulated exhaust constituents, to an engine cylinder that is already crowded with other components (e.g., liquid fuel injectors, exhaust valves, intake valves, exhaust manifolds, intake manifolds, overhead cam, rocker arm, etc.). The design of injector body 122 in accordance with various exemplary implementations of this disclosure may be easily adapted for mounting on existing cylinder heads. The injector body design may also provide flexibility in the control of hydraulic fluid pressures used to actuate the gas admission valve 202, and in the control of the pressures of the gaseous fuel supplied to the injector body 122. The injector body 122 provides a robust platform for supplying sufficient hydraulic fluid pressure to enable rapid and accurate actuation of the gas admission valve 202 over a wide range of fueling levels. A relatively high spring force may be required to seal the gas admission valve 202 against high gaseous fuel pressures contained within the gaseous fuel inlet chamber 206. This high spring force generated by the gas admission valve spring 180 will have to be overcome when actuating the gas admission valve 202. The injector body design provides hydraulic fluid passageways and actuation surfaces that allow for the generation of large hydraulic forces at relatively low and inexpensively produced hydraulic fluid pressures. Moreover, the robustness of the injector body design may allow for accurate control of gaseous fueling levels from 100% of maximum fueling levels down to less than 7% of maximum fueling levels.

The electronically controlled energization of the solenoid-operated hydraulic poppet valve 160 enables accurate control of the timing of supply of pressurized hydraulic fluid for actuation of the gas admission valve 202. Similarly, the electronically controlled de-energization of the solenoid-operated hydraulic poppet valve 160 enables rapid draining of the hydraulic fluid from check valve inlet passageway 125 and the hydraulic fluid actuation passageway 123 to allow the gas admission valve 202 to return to its seat and cut off gaseous fuel injection.

As shown in the exemplary method of FIG. 4, hydraulic fluid pressure of hydraulic fluid supplied to the injector body 122 may be regulated (Step: 402). Regulation of the hydraulic fluid pressure may be achieved by a dedicated pump and/or regulator, or in alternative implementations, may be achieved by the same pump and/or regulator that are used to supply the hydraulic fluid for other purposes, such as engine lubrication. The pressurized hydraulic fluid may be the same engine oil that is used for engine lubrication, diesel fuel that is used in a dual fuel engine, or another hydraulic fluid used exclusively for actuating the gas admission valve 202.

The pressurized hydraulic fluid may be received at the hydraulic fluid inlet chamber 124 in the injector body 122 (Step: 404). As described above, the hydraulic fluid inlet chamber 124 may be defined as an annulus located below a lower, frustoconical seat 126 of the valve chamber 128. The solenoid-actuated poppet valve 160 contained within the valve chamber 128 may be normally biased by poppet valve spring 130 into contact with the frustoconical seat 126. In this normally closed position the poppet valve 160 prevents the pressurized hydraulic fluid in hydraulic fluid inlet chamber 124 from entering the rest of the valve chamber 128.

The pressure of gaseous fuel for supply to the injector body 122 may be regulated independently from the regulation of hydraulic fluid pressure (Step: 406). The pressurized gaseous fuel may be received at the gaseous fuel inlet chamber 206 in the injector body 122 (Step: 408). The pressurized gaseous fuel may be normally retained in the gaseous fuel inlet chamber 206 by the gas admission valve 202. The gas admission valve spring 180 may be retained at least partially within injector body 122 by the plate stop 190, with the gas admission valve spring 180 applying a force against the gas admission valve 202 to bias the flared first end 208 of the gas admission valve 202 against the frustoconical shaped outlet opening 216 from the gaseous fuel inlet chamber 206. A wide range of fueling levels and gaseous fuel pressures may be accommodated since, as described above, the injector body design allows for robust hydraulic fluid passageways and actuation surfaces. These robust hydraulic fluid passageways and actuation surfaces allow relatively low hydraulic fluid actuation pressures to actuate the gas admission valve 202 against large spring forces generated by the gas admission valve spring 180. The large spring forces may be required to maintain a tight seal against high pressure gaseous fuel in the gaseous fuel inlet chamber 206 when the gas admission valve 202 is not being actuated. As discussed above, the strength of the biasing force generated by the gas admission valve spring 180 may be determined as a function of the difference in pressure between the positive pressure in the intake manifold and the pressure of the pressurized gaseous fuel. A force larger than this difference in pressure times the surfaces of the gas admission valve on which the pressures are acting may be large enough to ensure that the gas admission valve seats against the frustoconical shaped outlet opening 216 with sufficient force to prevent leakage of the gaseous fuel.

The solenoid 172 may receive one or more signals indicative of various parameters of the gaseous fuel injection (Step: 410). The one or more signals supplied to solenoid 172 may be provided by a computer processor that may determine the various parameters such as timing of gaseous fuel injection, frequency of injection, and duration of injection based on inputs that may include, but are not limited to the type of engine, the work application, the type of fuel, cetane levels of the fuel, emissions parameters, ambient temperatures, and power output requirements.

The solenoid 172 may be energized in accordance with the received signals to move the poppet valve 160 from a normally closed position to an open position where the pressurized hydraulic fluid in the hydraulic fluid inlet chamber 124 is allowed to enter the valve chamber 128 and the hydraulic fluid actuation passageway 123 leading from the valve chamber 128 (Step: 412). The gas admission valve 202 may be actuated from a normally closed position to a gaseous fuel injection position by providing fluid communication from the hydraulic fluid inlet chamber 124 to the check valve inlet passageway 125 off of the hydraulic fluid actuation passageway 123 (Step: 414). When the solenoid 172 is no longer energized, the armature 170, the attachment member 174, and the poppet valve 160 may be returned by the poppet valve spring 130 to the normally closed position, with the tapered portion 162 of the poppet valve 160 seated on the lower frustoconical seat 126 of the valve chamber 128. In this position the pressurized hydraulic fluid that has entered check valve inlet passageway 125 during actuation of the gas admission valve 202 returns through the hydraulic fluid actuation passageway 123 to the valve chamber 128, and exits through the angled drain passageways 144 and the hydraulic fluid exit passageways 150. The gas admission valve spring 180 returns the gas admission valve 202 to its seated position, thereby stopping gaseous fuel injection from gaseous fuel inlet chamber 206. As the gas admission valve spring 180 forces the gas admission valve 202 back to its seated position, hydraulic fluid trapped in the hydraulic fluid chamber between the piston body portion 230 and the piston hat portion 220 of the check valve 210 is forced out through the axially arranged bleed hole 224 through the piston hat portion 220, and out through the radial venting holes 232. The resistance to this flow of hydraulic fluid out of the hydraulic fluid chamber may act as a damping or snubbing mechanism along with check valve spring 222. This damping or snubbing feature may help to prevent the gas admission valve 202 from closing at too rapid of a rate, or from being slammed close against the frustoconical shaped outlet opening 216 from the gaseous fuel inlet chamber 206 when the solenoid 172 is de-energized and pressurized hydraulic fluid is no longer supplied to the check valve inlet passageway 125.

It will be apparent to those skilled in the art that various modifications and variations can be made to the disclosed port injection system without departing from the scope of the disclosure. Other embodiments of the port injection system will be apparent to those skilled in the art from consideration of the specification and practice of the port injection methods disclosed herein. It is intended that the specification and examples be considered as exemplary only, with a true scope of the disclosure being indicated by the following claims and their equivalents.

What is claimed is:

1. A port injection system for gaseous fuels, comprising:
an injector body defining a hydraulic fluid inlet chamber, a hydraulic fluid exit passageway, a hydraulic fluid actuation passageway, a check valve inlet passageway fluidly connected with the hydraulic fluid actuation passageway, a valve chamber, and a gaseous fuel inlet chamber;
an electrical solenoid actuator mounted to the injector body, the electrical solenoid actuator including a movable armature;
a poppet valve connected to the movable armature and disposed within the valve chamber, the poppet valve being movable between a pressurized hydraulic fluid flow blocking position and a pressurized hydraulic fluid flow passing position;
a check valve disposed within the check valve inlet passageway,
wherein the check valve includes a piston hat portion and a piston body portion that are normally biased a distance apart from each other within the check valve inlet passageway by a check valve spring, with a hydraulic fluid chamber defined between the piston hat portion and the piston body portion, and
a gas admission valve disposed at least partially within the gaseous fuel inlet chamber and in contact with the check valve such that movement of the check valve by hydraulic fluid entering the check valve inlet passageway results in actuation of the gas admission valve away from a normally closed position closing off the gaseous fuel inlet chamber to a fuel injection position wherein gaseous fuel is allowed to flow from the gaseous fuel inlet chamber into an intake manifold or intake port of an engine on which the injector body is mounted, wherein at least one of the piston hat portion and the piston body portion includes one or more openings therethrough configured to create a dampening feature by partially restricting the flow of hydraulic fluid from the hydraulic fluid chamber to the check valve inlet passageway and the hydraulic fluid actuation passageway when the gas admission valve is biased to the normally closed position.

2. The port injection system of claim 1, wherein the gas admission valve is biased to the normally closed position by a gas admission valve spring.

3. The port injection system of claim 1, wherein a top portion of the poppet valve slides axially within a sleeve positioned at an upper extent of the valve chamber, the sleeve including one or more drain passageways passing radially through the sleeve and exiting into one or more hydraulic fluid exit passageways defined in the injector body.

4. The port injection system of claim 1, wherein the hydraulic fluid inlet chamber is in the shape of an annulus defined around a lower extent of the valve chamber below a lower frustoconical seat of the valve chamber.

5. The port injection system of claim 4, wherein the poppet valve includes an intermediate tapered portion that seats against the lower frustoconical seat of the valve chamber when the poppet valve is in the hydraulic fluid flow blocking position.

6. The port injection system of claim 3, wherein the poppet valve includes an annular recess formed around the top portion of the poppet valve, and wherein the annular recess overlaps the one or more drain passageways when the poppet valve is in the pressurized hydraulic fluid flow blocking position.

7. The port injection system of claim 6, wherein hydraulic fluid within the check valve inlet passageway and the hydraulic fluid actuation passageway is in fluid communication with the one or more drain passageways when the poppet valve is in the pressurized hydraulic fluid flow blocking position.

8. The port injection system of claim 1, further comprising a venting passageway fluidly connected to the check valve and a hat-shaped plug, wherein the hat-shaped plug is configured to provide controlled venting of gases trapped within the hydraulic fluid.

9. The port injection system of claim 1, wherein the gas admission valve includes a flared first end seated against a frustoconical shaped outlet opening from the gaseous fuel inlet chamber and a piston-shaped portion integrally formed with the piston body portion.

10. The port injection of claim 2, further comprising a plate stop configured to retain the gas admission valve spring and the gas admission valve in the injector body.

11. The port injection system of claim 1, wherein the dampening features prevents the gas admission valve from closing at a rate faster than approximately 1 meter/second.

12. An engine system, comprising:
a bank of cylinders;
a gaseous fuel rail running along the bank of cylinders and configured to supply pressurized gaseous fuel to each of the cylinders;
a plurality of junction blocks and gaseous fuel conduits spaced along the gaseous fuel rail and configured to supply the gaseous fuel from the rail to each of the cylinders;
a plurality of injector bodies, each injector body being associated with one or more cylinders of the bank of cylinders, and each injector body defining a hydraulic fluid inlet chamber disposed within a valve chamber, a hydraulic fluid exit passageway, a hydraulic fluid actuation passageway, a check valve inlet passageway fluidly connected with the hydraulic fluid actuation passageway, and a gaseous fuel inlet chamber;
an electrical solenoid actuator mounted to each injector body, the electrical solenoid actuator including a movable armature;
a poppet valve connected to the movable armature and disposed within the valve chamber, the poppet valve being movable between a pressurized hydraulic fluid flow blocking position and a pressurized hydraulic fluid flow passing position;
a check valve disposed within the check valve inlet passageway, wherein the check valve includes a piston hat portion and a piston body portion that are normally biased a distance apart from each other within the check valve inlet passageway by a check valve spring, with a hydraulic fluid chamber defined between the piston hat portion and the piston body portion; and
a gas admission valve disposed at least partially within the gaseous fuel inlet chamber and in contact with the check valve such that movement of the check valve by pressurized hydraulic fluid entering the check valve inlet passageway results in actuation of the gas admission valve away from a normally closed position closing off the gaseous fuel inlet chamber to a fuel injection position wherein gaseous fuel is allowed to flow from the gaseous fuel inlet chamber into an intake manifold or intake port for the one or more cylinders.

13. The engine system of claim 12, wherein the check valve is configured to absorb a compressive shock transferred to the check valve from the gas admission valve.

14. The engine system of claim 12, wherein at least one of the piston hat portion and the piston body portion includes one or more openings therethrough that create a restriction to hydraulic fluid flow from the hydraulic fluid chamber to the check valve inlet passageway and the hydraulic fluid actuation passageway when the gas admission valve is biased to the normally closed position.

15. The port injection system of claim 8, wherein the venting passageway is additionally fluidly connected to the hydraulic fluid actuation passageway.

16. The port injection system of claim 9, wherein the frustoconical shaped outlet opening having a first diameter, the piston shaped portion of the gas admission valve has a second diameter, and the check valve as a third diameter, wherein said first diameter is greater than the second diameter, and the second diameter is greater than the third diameter.

17. An injector body for a port injection system, comprising:
- a hydraulic fluid inlet chamber disposed within a valve chamber, a hydraulic fluid exit passageway, a hydraulic fluid actuation passageway, a check valve inlet passageway fluidly connected with the hydraulic fluid actuation passageway, and a gaseous fuel inlet chamber;
- a poppet valve disposed within the valve chamber, the poppet valve being movable within the valve chamber between a pressurized hydraulic fluid flow blocking position and a pressurized hydraulic fluid flow passing position,
  - wherein a pressurized hydraulic fluid supplied to the hydraulic fluid inlet chamber is prevented from entering the rest of the valve chamber, when the poppet valve is in the pressurized hydraulic fluid flow blocking position;
- a check valve disposed within the check valve inlet passageway,
  - wherein the check valve is fluidly connected to a venting passageway,
  - wherein the check valve includes a piston hat portion and a piston body portion that are normally biased a distance apart from each other within the check valve inlet passageway by a check valve spring, with a hydraulic fluid chamber defined between the piston hat portion and the piston body portion; and
- a gas admission valve disposed at least partially within the gaseous fuel inlet chamber and in contact with the check valve, wherein movement of the poppet valve to a pressurized hydraulic fluid flow passing position allows hydraulic fluid to flow from the hydraulic fluid inlet chamber through the hydraulic fluid actuation passageway and into the check valve inlet passageway that results in movement of the check valve and actuates the gas admission valve away from a normally closed position closing off the gaseous fuel inlet chamber to a fuel injection position wherein gaseous fuel is allowed to flow from the gaseous fuel inlet chamber into an intake manifold or intake port of an engine on which the injector body is mounted,
wherein at least one of the piston hat portion and the piston body portion includes one or more openings therethrough configured to create a dampening feature by partially restricting the flow of hydraulic fluid from the hydraulic fluid chamber to the check valve inlet passageway and the hydraulic fluid actuation passageway when the gas admission valve is biased to the normally closed position,
wherein the injector body is configured to mate with an actuator for actuating the poppet valve.

18. The injector body for a port injection system of claim 17, wherein a top portion of the poppet valve slides axially within a sleeve positioned at an upper extent of the valve chamber, the sleeve including one or more drain passageways passing radially through the sleeve and exiting into one or more hydraulic fluid exit passageways defined in the injector body, wherein when the poppet valve is in the pressurized hydraulic fluid flow passing position, an annular recess defined around an outer circumference of the top portion of the poppet valve is out of alignment with the drain passageway to prevent hydraulic fluid entering the valve chamber from exiting through the hydraulic fluid exit passageway.

* * * * *